(12) United States Patent
Berger et al.

(10) Patent No.: US 8,770,392 B2
(45) Date of Patent: Jul. 8, 2014

(54) WIDTH-ADJUSTING DEVICE FOR CONVEYOR CORRIDOR(S)

(75) Inventors: Julien Berger, Octeville-sur-Mer (FR); Brice Perreard, Octeville-sur-Mer (FR); David Perrin, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 175 days.

(21) Appl. No.: 13/377,726

(22) PCT Filed: Jun. 10, 2010

(86) PCT No.: PCT/FR2010/051160
§ 371 (c)(1), (2), (4) Date: Dec. 12, 2011

(87) PCT Pub. No.: WO2010/142919
PCT Pub. Date: Dec. 16, 2010

(65) Prior Publication Data
US 2012/0097505 A1 Apr. 26, 2012

(30) Foreign Application Priority Data

Jun. 11, 2009 (FR) ..................................... 09 53871
Jun. 11, 2009 (WO) ................. PCT/FR2009/051097
May 12, 2010 (FR) ..................................... 10 53753

(51) Int. Cl.
*B65G 39/18* (2006.01)
(52) U.S. Cl.
USPC ......... 198/836.3; 198/813; 198/814; 198/815
(58) Field of Classification Search
USPC ...................................... 198/836.3, 813–815
See application file for complete search history.

(56) References Cited

U.S. PATENT DOCUMENTS

| 1,176,228 A | 3/1916 | McIntosh |
| 2,425,158 A | 8/1947 | Masich |
| 2,615,555 A | 10/1952 | Carter |

(Continued)

FOREIGN PATENT DOCUMENTS

| DE | 87 14 605 U1 | 1/1988 |
| DE | 43 30 702 A1 | 3/1995 |

(Continued)

OTHER PUBLICATIONS

French Preliminary Search Report for FR0803276, dated Jan. 6, 2009.

(Continued)

Primary Examiner — Ramya Burgess
Assistant Examiner — Lester Rushin
(74) Attorney, Agent, or Firm — Sughrue Mion, PLLC

(57) ABSTRACT

The invention relates to a width-adjusting device for conveyor corridor(s), comprising a wide gear-reduction mechanism connected to the frame (5) of said conveyor, wherein said mechanism is arranged between the control shaft (12) and the wall(s) of said corridor. The device includes: a final drive capable of reverse operation and consisting of said control shaft (12) in the form of an endless screw and of a toothed wheel (11); and a system for controlling at least one of the walls of said corridor, consisting of an endless screw (13) and a nut, the endless screw being mobile or fixed relative to said toothed wheel (11). The shaft (12) of the final drive is a flexible shaft having a long length and engaging with the tension-retaining system (20) for absorbing the pulling and pushing forces in the rotation direction thereof.

12 Claims, 9 Drawing Sheets

(56) References Cited

U.S. PATENT DOCUMENTS

Figure 1:
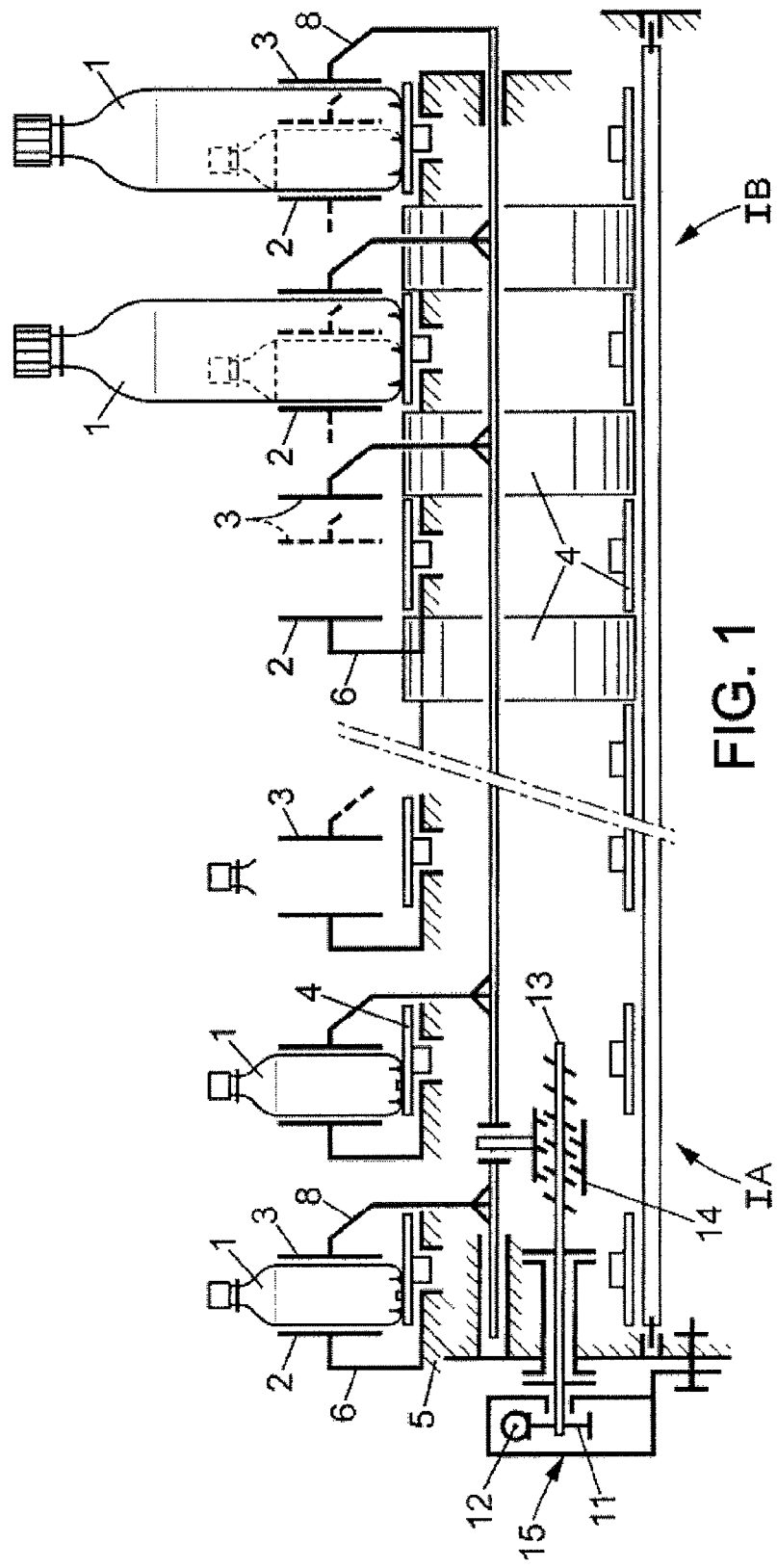

| Patent No. | Date | Inventor |
|---|---|---|
| 3,554,353 A | 1/1971 | Raudat |
| 3,767,027 A | 10/1973 | Pund et al. |
| 4,432,189 A | 2/1984 | Raudat |
| 5,090,556 A | 2/1992 | Ach et al. |
| 5,211,280 A | 5/1993 | Houde |
| 5,237,795 A | 8/1993 | Cheney et al. |
| 5,291,988 A | 3/1994 | Leonard |
| 5,546,734 A | 8/1996 | Moncrief et al. |
| 6,050,396 A | 4/2000 | Moore |
| 6,059,096 A | 5/2000 | Gladieux |
| 6,209,707 B1 | 4/2001 | Ronchi |
| 6,305,528 B1 | 10/2001 | Leonard |
| 6,378,695 B1 | 4/2002 | Rinne |
| 6,778,695 B1 | 8/2004 | Schellenberg et al. |
| 6,889,823 B2 | 5/2005 | Delaporte et al. |
| 7,246,697 B2 | 7/2007 | Hosch et al. |
| 7,392,894 B2 | 7/2008 | Jacob et al. |
| 7,431,150 B2 | 10/2008 | Ranger |
| 7,530,453 B2 | 5/2009 | Ingraham |
| 7,546,916 B2 | 6/2009 | Jenny |
| 7,607,531 B2 | 10/2009 | Bonhomme et al. |
| 7,721,876 B2 | 5/2010 | Hartness et al. |
| 7,832,549 B2 | 11/2010 | Honeycutt |
| 7,926,648 B2 | 4/2011 | Petrovic et al. |
| 8,186,503 B1 | 5/2012 | Burchell et al. |
| 2009/0223782 A1 | 9/2009 | Martin et al. |
| 2010/0145109 A1 | 6/2010 | Marion |
| 2011/0088997 A1 | 4/2011 | Petrovic et al. |

FOREIGN PATENT DOCUMENTS

| | | |
|---|---|---|
| DE | 20 2005 001 689 U1 | 10/2005 |
| EP | 1 159 209 A1 | 12/2001 |
| FR | 1 420 368 | 12/1965 |
| FR | 2 806 395 A1 | 9/2001 |
| FR | 2 918 973 A1 | 1/2009 |
| FR | 2 918 983 B1 | 12/2010 |
| GB | 758302 A | 10/1956 |
| GB | 896425 A | 5/1962 |
| WO | 00/17073 A1 | 3/2000 |
| WO | 2009/150379 A1 | 12/2009 |

OTHER PUBLICATIONS

International Search Report for PCT/FR2009/051097, dated Oct. 30, 2009.

Preliminary Search Report for FR 0953871, dated Feb. 4, 2010.

International Search Report for PCT/FR2010/051159, dated Sep. 2, 2010.

International Search Report for PCT/FR2010/051160, dated Oct. 22, 2010.

Office Action dated Mar. 7, 2013, issued by the U.S. Patent and Trademark Office in U.S. Appl. No. 13/377,323.

Office Action dated Mar. 26, 2013, issued by the U.S. Patent and Trademark Office in U.S. Appl. No. 12/997,526.

WIDTH-ADJUSTING DEVICE FOR CONVEYOR CORRIDOR(S)

CROSS REFERENCE TO RELATED APPLICATIONS

This application is a National Stage of International Application No. PCT/FR2010/051160 filed on Jun. 10, 2010, which claims priority from French Patent Application Nos. 09 53871 filed Jun. 11, 2009, PCT/FR2009/051097 filed Jun. 11, 2009 and 1053753 filed May 12, 2010, the contents of all of which are incorporated herein by reference in their entirety.

The invention relates to the general technical field of conveyors and in particular to the field of conveyors of bottles, packs, or other objects.

The invention more particularly concerns a device for controlling the position of one or more means serving to guide objects conveyed by the conveyor.

The invention relates to all types of conveyors: a continuous conveyor belt, a single row or multi-row conveyor, or an air conveyor with neck guides for the bottles, for example. It concerns adjusting the position of the guide rail(s) or wall(s) of the conveyor corridor(s) to adapt the corridor width to the size of the bodies of the bottles, packs, or other objects.

There are known means for adjusting the spacing between the corridor walls for continuous conveyor belts on which the objects sit.

Document U.S. Pat. No. 5,211,280 shows a device for adjusting the width of a conveyor corridor. This device comprises guides which define the width of the corridor. These guides are supported by regularly spaced racks which are maneuvered by pinions connected to each other by shafts with universal joints.

At the end of the shaft, a control wheel or steering wheel makes it possible to adjust, with a single movement, the position of the guide acting as a wall for the corridor, according to the dimension of the products to be conveyed, particularly bottles.

A similar prior art device is also presented in document U.S. Pat. No. 6,778,695. In this document, the shaft that makes it possible to simultaneously maneuver the set of racks supporting the corridor walls resembles a flexible shaft.

These devices, with their racks and pinions, do not allow precise adjustment of the guide positions.

Other devices offer greater precision, as described in document U.S. Pat. No. 6,209,707, through an adjustment system which comprises screws for maneuvering the different guides or walls, said screws having different pitches and each being attached to pairs of guides or walls, in order to adjust the width of each corridor.

As in the other documents cited above, this device does not offer great precision in the adjustment control. All these devices do not have intrinsic irreversibility, meaning that it is necessary, particularly for the first two devices described in the cited documents, to have supplemental means to lock the position of the racks in order to prevent any movement, particularly a change in the adjusted width of the corridors.

The use of pneumatic actuators to adjust the guide walls, as described in document U.S. Pat. No. 6,305,528, is a technical solution in which the reliability and accuracy can be impacted by leaks and/or variations in the flow, because of the length of the pipes.

The aim of the invention is to eliminate the above limitations by improving the reliability and accuracy of the adjustment means.

An object of the invention is therefore to provide an adjusting device that is simplified in design without altering its reliability, particularly the precision of the adjustment. An object of the invention is therefore to provide a new control and adjustment module at a substantially lower cost than the conventional adjustment means.

Another object of the invention is to propose an assembly method which offers unequalled precision in the initial positioning of the guiding means during the installation of said device on a conveyor.

The objects of the invention are achieved by the adjusting device described below. Its main advantage lies in its versatility. It can, in fact, be assembled onto various types of conveyors.

Another advantage of the adjusting device of the invention lies in the great simplicity of its use and in the minimization of the chances of operational failures.

Another advantage of the adjusting device of the invention lies in an operation which does not require hydraulic or pneumatic systems, nor lubrication.

Another advantage of the adjusting device of the invention lies in a significant reduction in the wiring.

The width-adjusting device for conveyor corridor(s) of the invention comprises a mechanism with high gear reduction integrally attached to the chassis of said conveyor, said mechanism being arranged between the control shaft and the wall or walls of said corridor and comprising:
- a final drive offering irreversible operation, consisting of:—said control shaft in the form of an endless screw, and—a toothed wheel,
- a system for maneuvering at least one of the walls of said corridor, consisting of an endless screw and a nut, said endless screw being mobile or fixed relative to said toothed wheel.

Still according to the invention, the final drive of the adjusting device operates with a ratio on the order of 1/40.

In another arrangement of the invention, the shaft of the final drive is a flexible shaft of the type used in the mechanisms of automobile window regulators. The flexible shaft comprises a central core having a diameter of approximately 4 mm onto which a metal wire such as piano wire having a diameter of approximately 2 mm is wound, said wire being held in place on said core by being tightly wound at a pitch of approximately 4 mm.

Still according to the invention, the adjusting device comprises, in the case of a flexible shaft which is very long, at least one system for maintaining the tension of said flexible shaft, said tensioning system being arranged between an end of said shaft and the chassis of the conveyor, to absorb the pulling and pushing forces exerted on said shaft according to the direction of rotation.

In another device of the invention, the tensioning system of the adjusting device comprises a thrust bearing placed between a ferrule integrally attached to an end of the flexible shaft and a shoulder, said shoulder being on a tube which is mobile relative to the chassis of the conveyor and which is held in position by an elastic means such as a pre-tensioned spring, so as to provide a compression displacement and an elongation displacement when there are no forces exerted on said flexible shaft.

Still according to the invention, the flexible shaft of the adjusting device is maneuvered by a motor means and said adjusting device comprises a control means for saving an adjustment set-point for the width of the corridor or corridors, and for actuating said motor as a function of said adjustment set-point.

In another arrangement of the invention, the motor for actuating the maneuvering mechanism is positioned at the midpoint of a flexible shaft or between two flexible shafts which are very long, the free end of each of the flexible shaft(s) being attached to a tensioning system.

Still according to the invention, the final drive consisting of the flexible shaft and the toothed wheel engages in a gearbox and, between two consecutive gearboxes, said flexible shaft is housed in a guiding protective cover, said cover having ends fitted into and/or attached to the corresponding gearboxes.

In another device of the invention, the gearbox consists of two half-shells made of acetal material, said gearbox comprising:
- these two half-shells, machined and intended to be attached to the chassis of the conveyor,
- a substantially cylindrical housing delimited by the half-shells when they are assembled, said housing being occupied by the toothed wheel,
- a passage calibrated for the flexible shaft and arranged in each half-shell, said passage being positioned orthogonally to the axis of said housing and tangential to said housing to allow the operation of the final drive consisting of the flexible shaft and toothed wheel pair, and, depending on the case,
- said half-shells comprise cylindrical projections to guide and cover the threading of the threaded shank for maneuvering the wall or walls of the corridor(s).

The invention also relates to a method for assembling the width-adjusting device for conveyor corridor(s) onto a single row or multi-row conveyor, said method consisting of:
- temporarily attaching one of the half-shells of each gearbox to the frame of said conveyor,
- sizing the covers which extend between two gearboxes and slipping them onto the corresponding portion of the flexible shaft,
- placing, in each half-shell, the final drive consisting of the flexible shaft and the toothed wheel with the corresponding covers,
- closing each gearbox by attaching the other half-shell to the half-shell already in place,
- connecting the flexible shaft to the motor and to the tensioning system.

In the case of an adjusting device in which the toothed wheel acts as a nut for the screw that maneuvers the corresponding wall, the method also consists of, after having placed the final drive in the half-shell, positioning said maneuvering screw in a pre-established position by means of a stop or, for example, a reference face such as the face corresponding to the end of the projection from the external half-shell.

The invention also relates to a tension module associated with a very long flexible shaft that is in the form of an endless screw at least 10 meters in length, said flexible shaft being driven at one of its ends by a motor means in order to maneuver the toothed wheels which actuate the means for adjusting one or more of the walls of the conveyor corridor(s), for example, said tension module being arranged at the free end of said flexible shaft to absorb the reaction forces in said shaft in order to eliminate, or at least reduce, the angular deviation in the driving of said actuating wheels. Said module comprises a tensioning system consisting of a thrust bearing placed between a ferrule integrally attached to said free end of said flexible shaft and a shoulder, said shoulder being on a tube centered around said flexible shaft and being mobile relative to the chassis of said conveyor while being held in position by an elastic means such as a pre-tensioned spring, in a manner that provides a compression displacement and an elongation displacement when there are no forces exerted on said flexible shaft.

Figure 2:
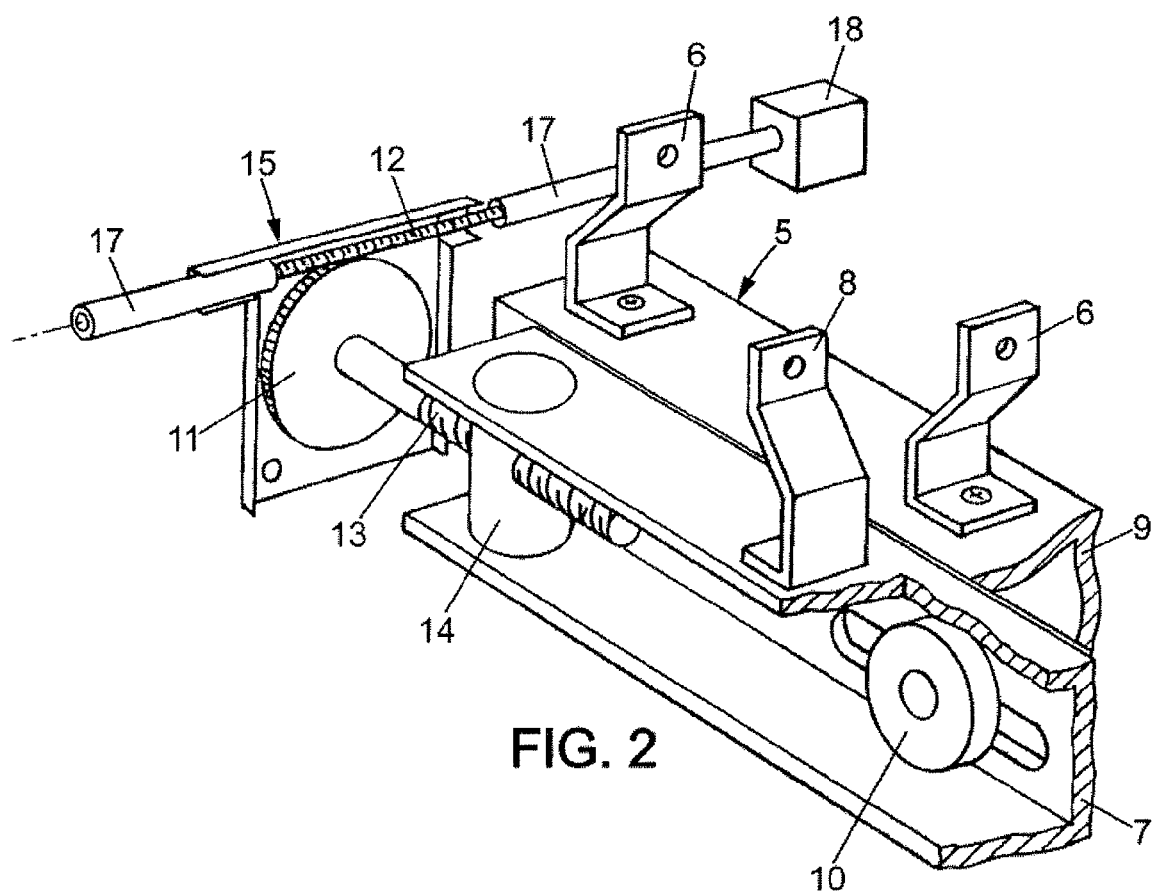
Figure 3:
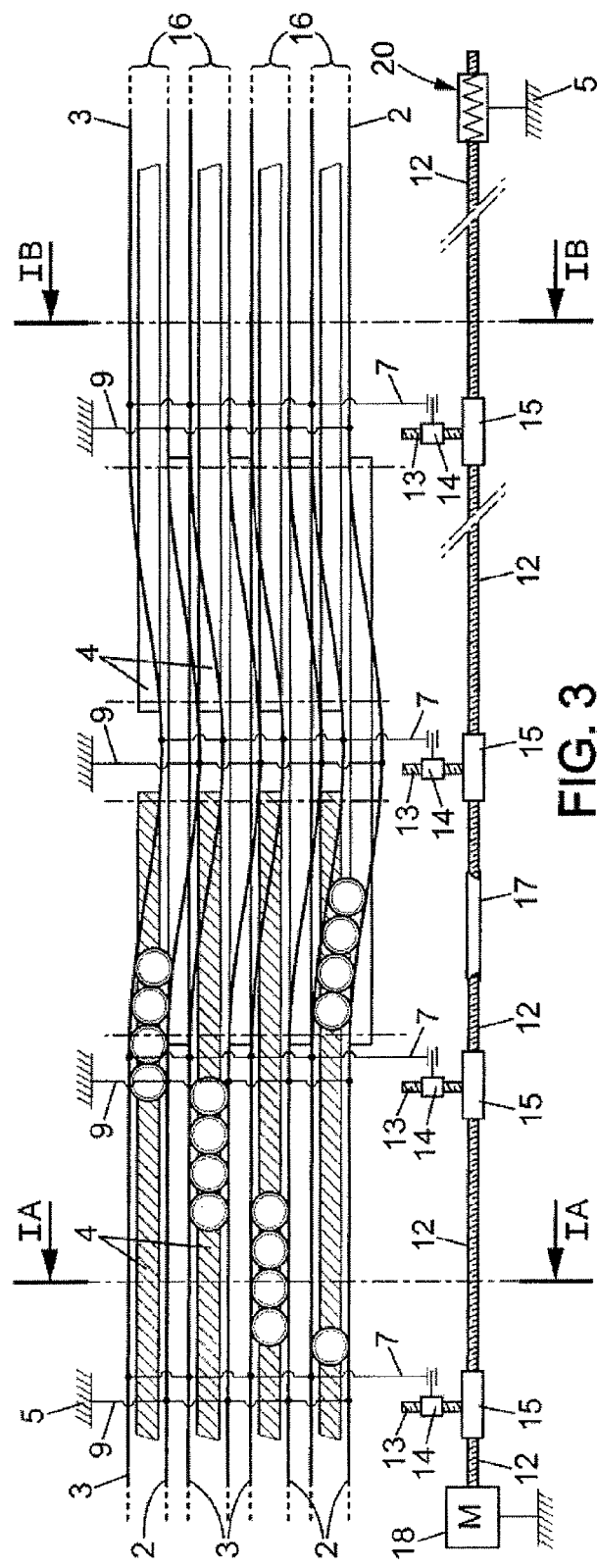
Figure 4:
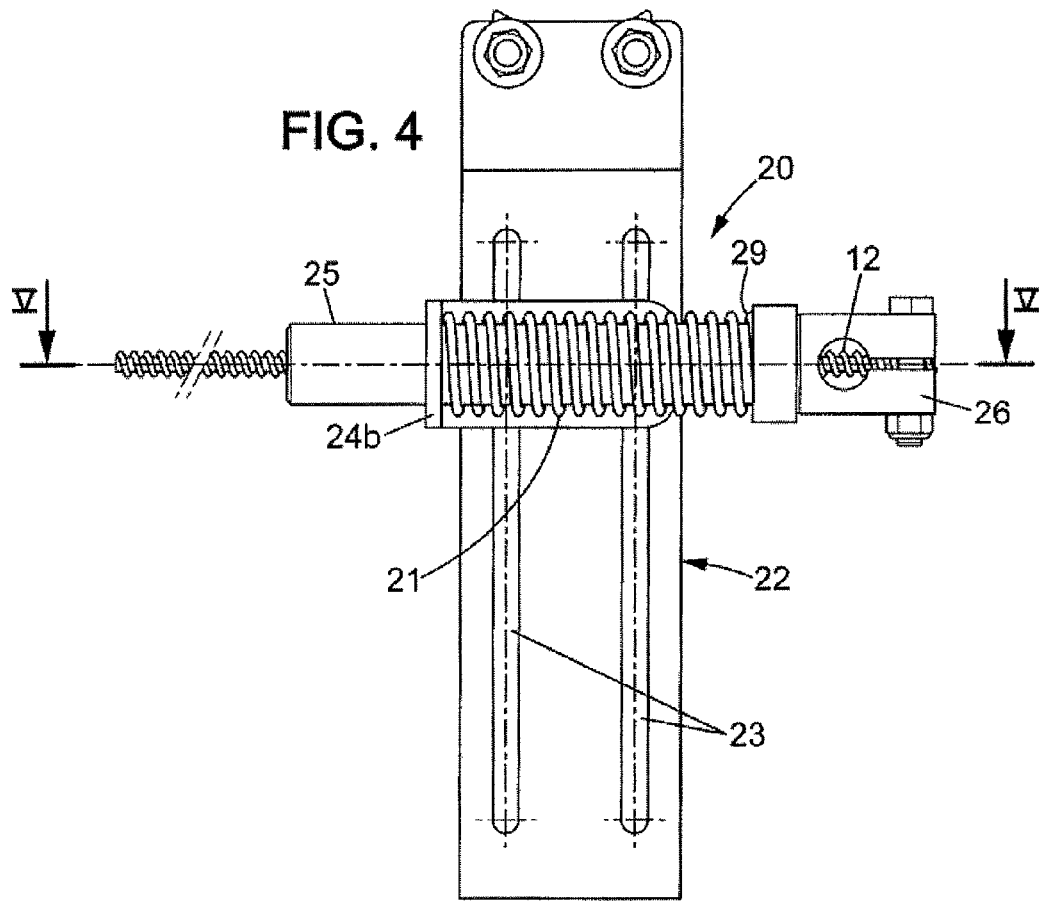
Figure 5:
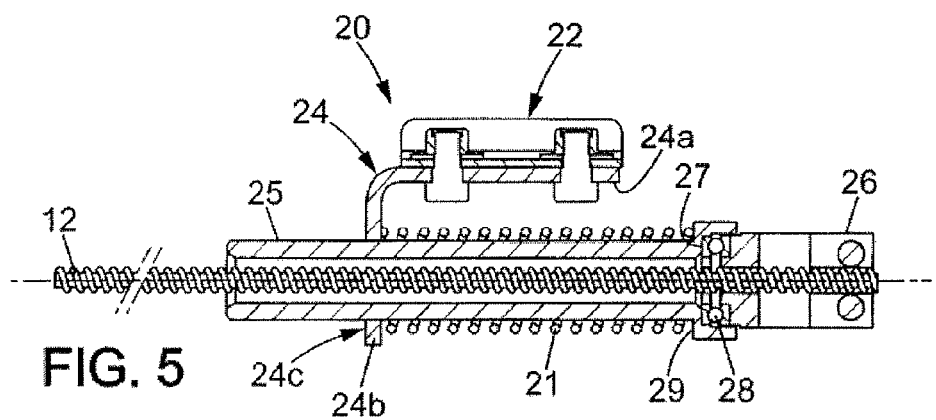
Figure 6:
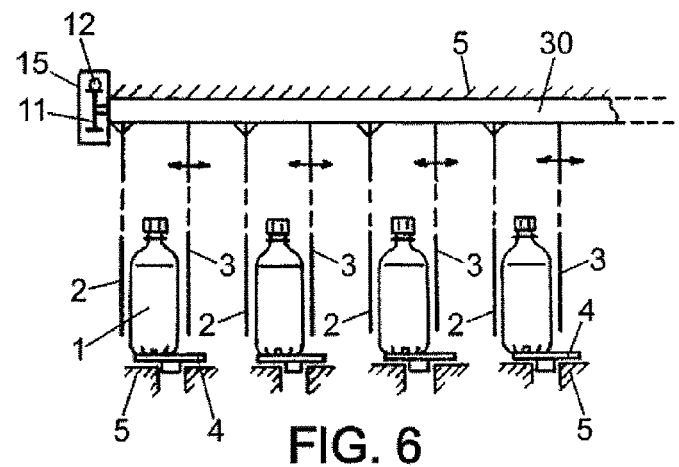
Figure 7:
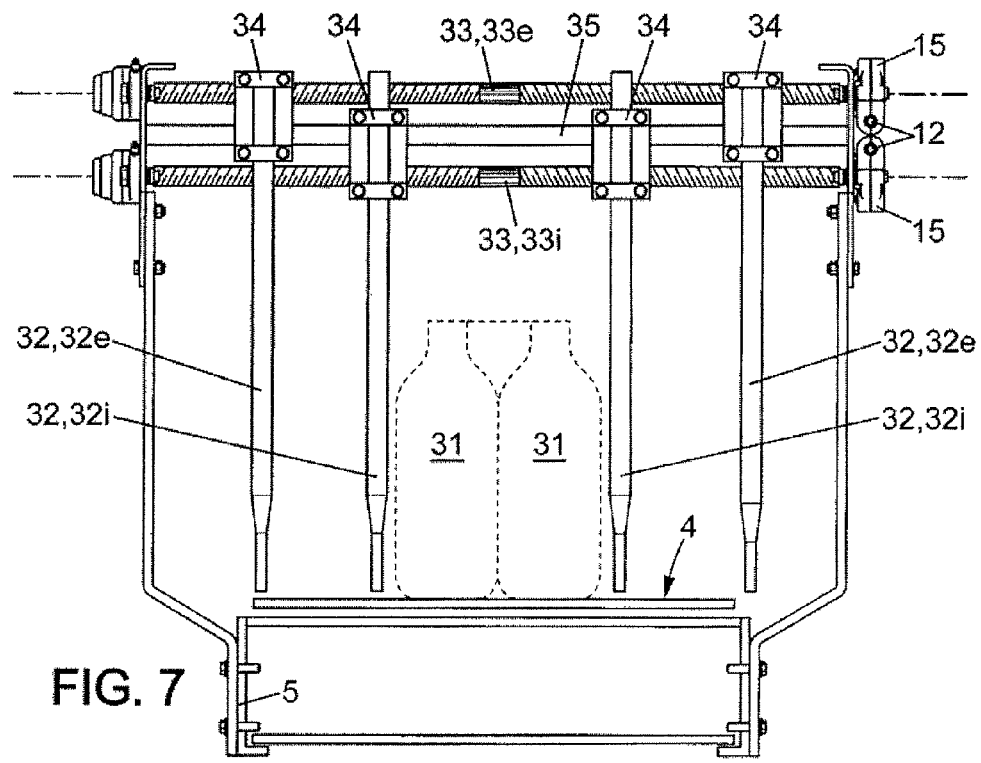
Figure 8:
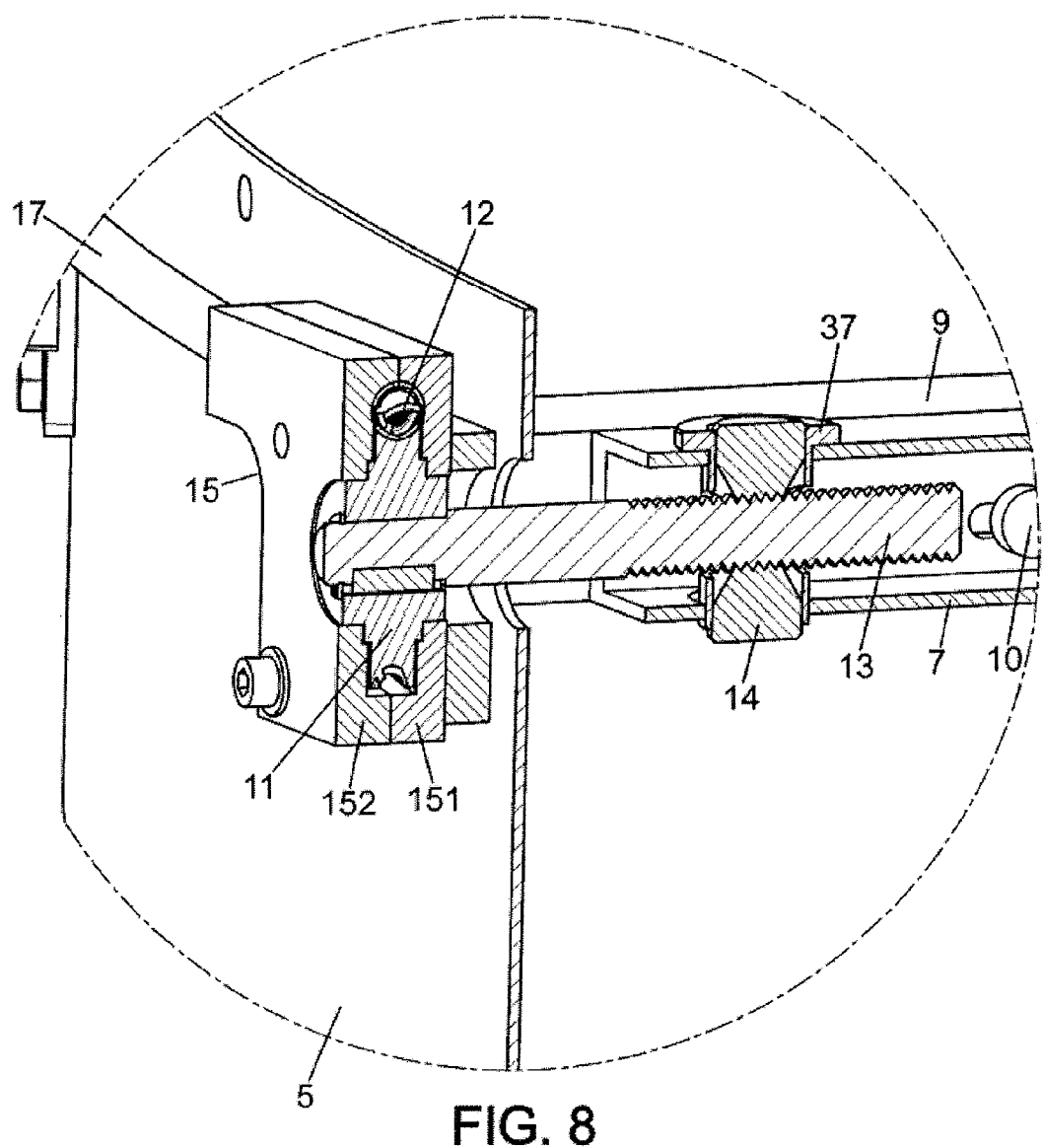
Figure 9:
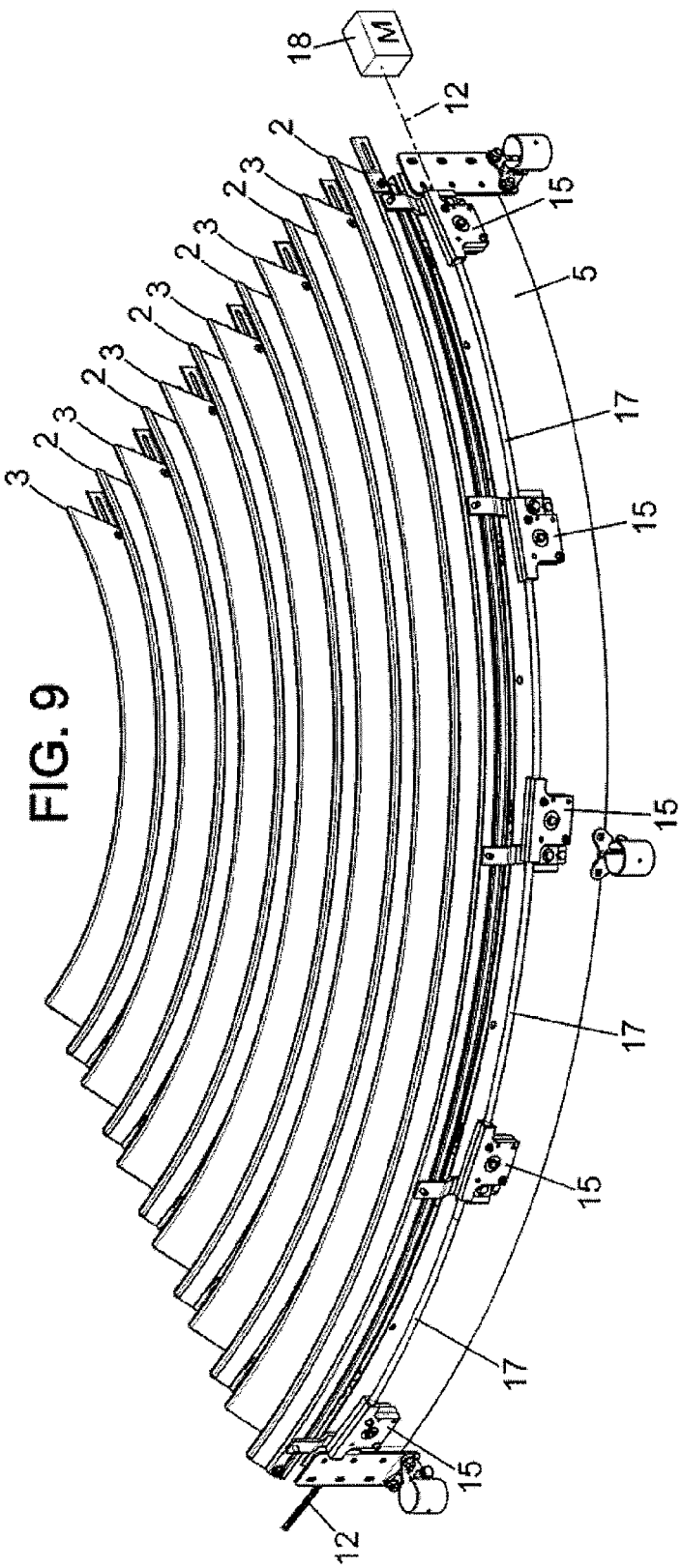
Figure 10:
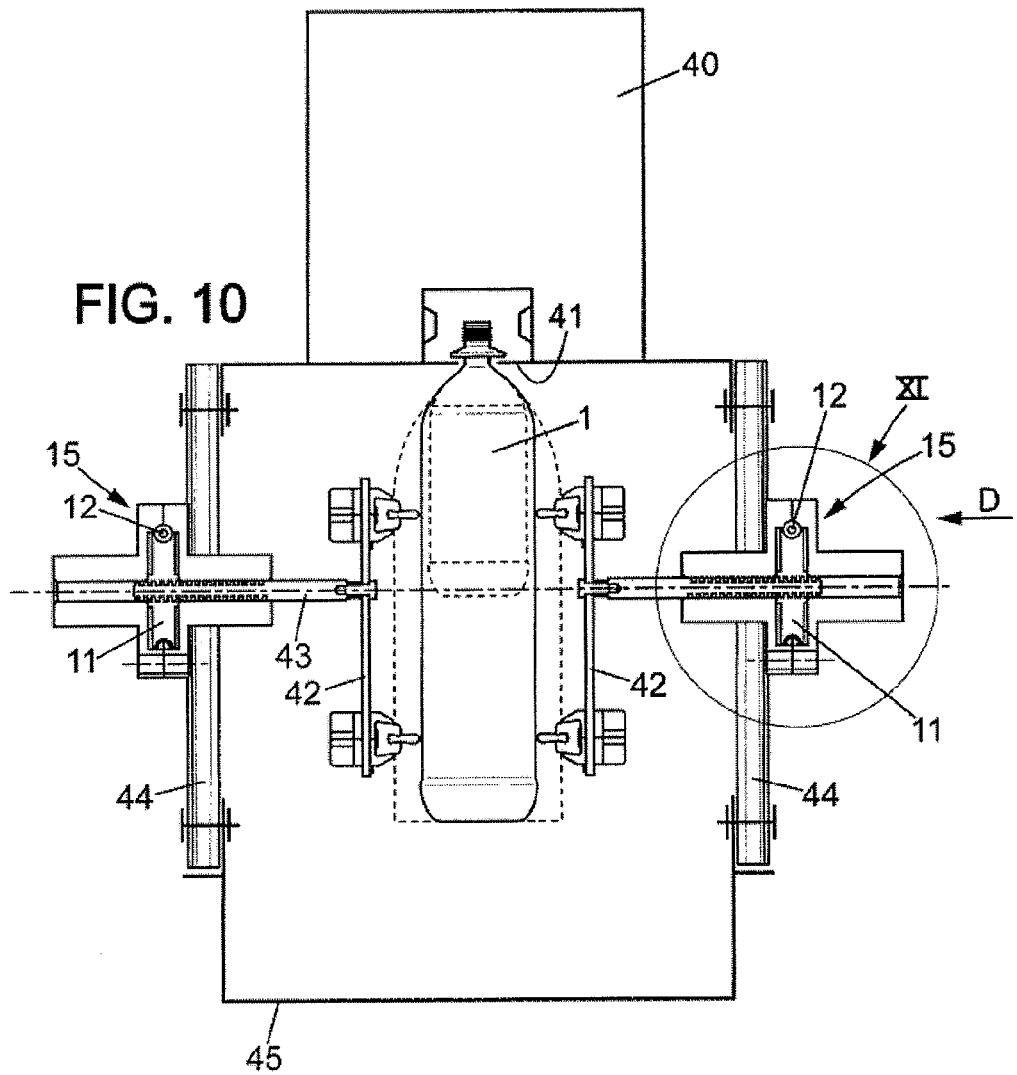
Figure 11:
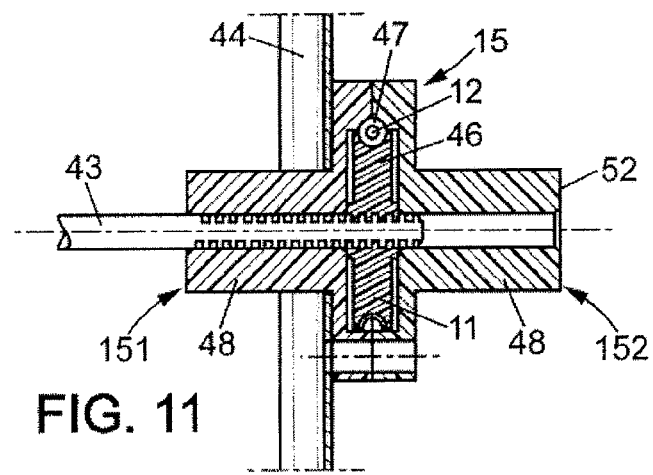
Figure 12:
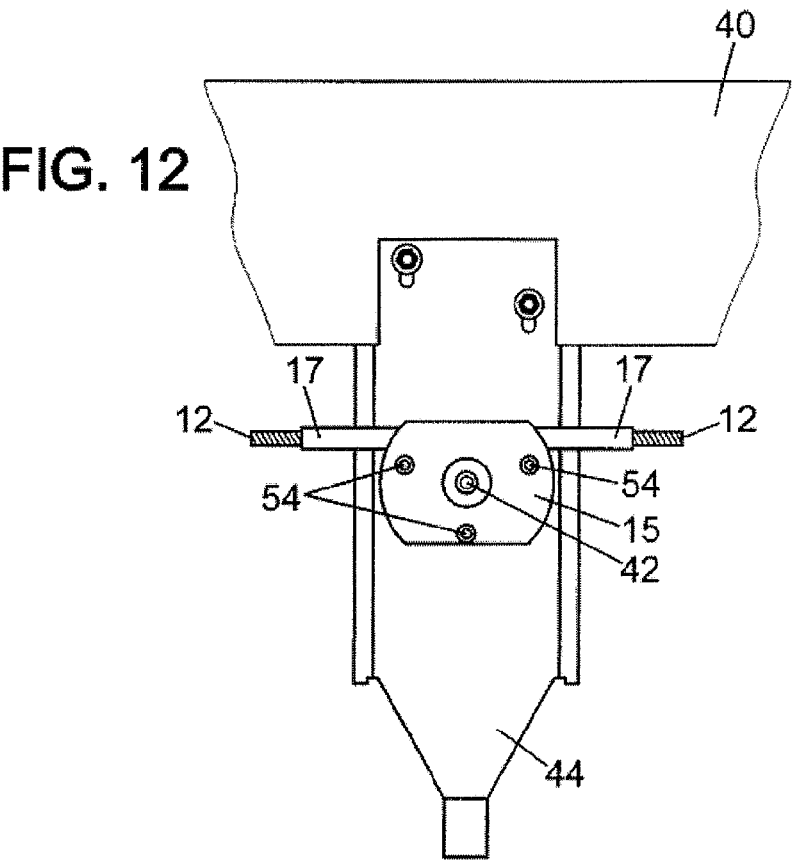
Figure 13:
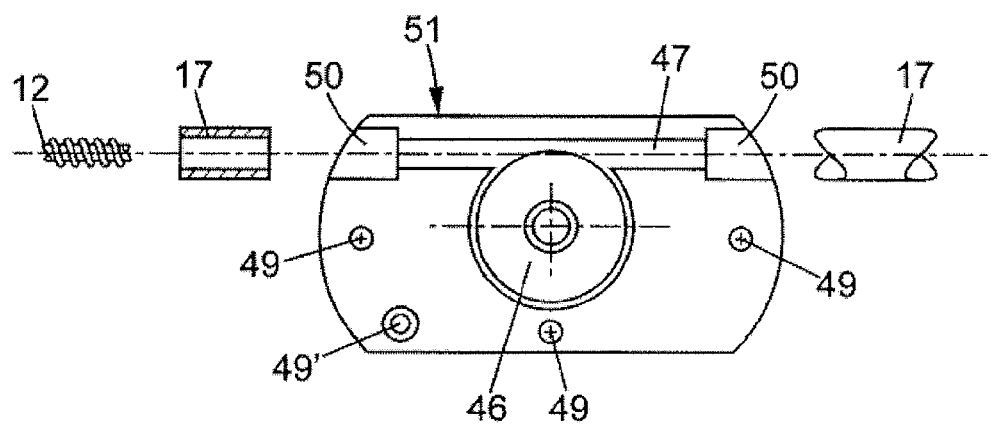

The invention and its advantages will become more apparent from the following description and the detailed embodiments provided as non-limiting examples, with reference to the attached figures in which:

FIG. 1 is an elevation view of two half cross-sections along AA and BB in FIG. 3, showing an example of a conveyor having multiple continuous belts and able to accommodate bottles of different sizes in its multiple single-row guide corridors, FIG. 2 is a partial perspective view showing the different component elements of the adjusting device of the invention for a multi-row conveyor, FIG. 3 is a partial plan view of a multi-row conveyor which uses the adjusting device of the invention at several locations to adjust the width of its different corridors as needed, FIG. 4 is an enlarged view showing details of an adjusting device of the invention, specifically an exemplary embodiment of a tensioning means for the flexible shaft of said device, FIG. 5 is a cross-sectional view along 5-5 in FIG. 4, FIG. 6 represents a variation in the application of the adjusting device, said adjusting device being installed in the upper portion of a conveyor and the walls of the different corridors of this conveyor are suspended, FIG. 7 is a transverse cross-sectional elevation view of another type of conveyor used for objects such as packs, said conveyor having adjusting devices of the invention to form one, two, or three corridors as needed, FIG. 8 is a partial cross-sectional view showing another version of the adjusting device represented in FIG. 2, said adjusting device being applied in FIG. 8 to a curved conveyor, FIG. 9 shows a portion of a multi-row curved conveyor which is laterally fitted on its outer circumference with the adjusting device of the invention which uses a flexible shaft, FIG. 10 is a transverse cross-sectional elevation view of a pneumatic conveyor for bottles supported by neck guides, said conveyor also having guides, or walls, at the body of said bottles, said body guides each being manipulated by an adjusting device of the invention to adapt the width of the corridor to the diameter of the bodies of said bottles, FIG. 11 is a transverse cross-sectional view showing more details of a gearbox installed onto one of the axle drops of the pneumatic conveyor, with the gearbox containing the final drive consisting of the flexible shaft and the toothed wheel, said toothed wheel acting as a maneuvering nut for the screw which is integrally attached to the guide, FIG. 12 is a side view of FIG. 10, showing the placement of a gearbox of the adjusting device of the invention, on an axle drop of the pneumatic conveyor, FIG. 13 shows the inner surface of a half-shell with partial representation of the flexible shaft and the covers which encase, on each side of said gearbox, the sections of the flexible shaft.

Elements that are structurally and operationally identical are denoted in different figures with the same numeric or alphanumeric references.

FIG. 1 shows a system of the invention, designed for conveying bottles 1. This system comprises several rectilinear corridors. Cross-section AA in this FIG. 1 shows small bottles 1 being guided, while cross-section BB shows large bottles 1 being guided.

Each corridor comprises two guide walls 2 and 3, or rails, said walls being arranged to face each other above a continuous belt 4.

In the exemplary embodiment in FIG. 1, the walls 2 are fixed and the walls 3 are mobile, meaning they are adjustable by means of the adjusting device of the invention which is detailed below.

The distance between the walls 2 and 3 of the corridors can therefore be adapted to the different diameters of the bottles 1.

The fixed walls 2 of the different corridors are supported by the chassis 5 of the conveyor by means of brackets 6 while the mobile walls 3 are supported by an appropriate structure detailed below.

These walls 3 are supported by a structure 7 by means of brackets 8. This structure 7 is mobile; it is in the form of a crosspiece which is transversely guided by a system of runners.

Preferably, as detailed in FIG. 2, the supporting structure 7 is in the form of a U-section crosspiece and is guided on a crosspiece 9 by means of a slide rail with rollers 10, said rollers 10 traveling within the U of said structure 7.

The crosspiece 9 is part of the chassis 5 and it is these different crosspieces 9 which support the fixed walls 2 by means of the brackets 6.

The walls 2 and 3 preferably comprise two parts, as described in document FR 2918973: a rigid metal core directly or indirectly connected to the chassis 5, and a guide of thermoplastic material which is in contact with the conveyed products, meaning the bottles 1.

This FIG. 1 shows an arrangement of the corridor walls 2 and 3, and of the adjusting device for these walls, which has the distinctive characteristic of leaving the top of the conveying system free and therefore offering completely unencumbered access, allowing an operator, for example, to intervene with the bottles 1.

The structure 7 is movable by the adjusting device of the invention, said device having the form of a maneuvering mechanism which operates with a very high gear reduction. This gear reduction comprises two reduction levels: a first reduction level consisting of a final drive comprising a toothed wheel 11 and a control shaft 12 in the form of an endless screw, and a second reduction level which comprises a maneuvering system having an endless screw 13 and a nut 14; the two reduction levels are irreversible, which eliminates the need for any supplemental locking or braking device to prevent movement of the walls 3.

The wheel 11-shaft 12 combination is housed in a gearbox 15 which is integrally attached to the chassis 5. The wheel 11 is integrally attached to the screw 13 and this screw 13 extends within the structure 7, passing through the nut 14. This nut 14 is mounted with play in the arms of the U which form the structure 7.

As an example, the wheel 11-shaft 12 combination has a reduction ratio of approximately 1/40 and the pitch of the screw 13 is approximately 4 mm.

This results in extremely easy adjustment and, more importantly, extreme precision. The adjustment time can be relatively long, on the order of a minute, to obtain a movement of the mobile wall 3 of 4 mm. This movement of the mobile wall 3 is programmable and does not require any direct intervention by the operator.

This type of maneuvering mechanism is regularly repeated, as represented in FIG. 3, along the length of the multi-row conveyor to ensure simultaneous adjustment of the various walls 3 along their entire length and to ensure a certain rigidity of said walls 3 constituting one of the sides of the corridors 16.

The different maneuvering mechanisms operate in a coordinated manner by means of the shaft 12 which runs along the side of the conveyor. The shaft 12 passes through the gearboxes 15 and each toothed wheel 11 arranged in the corresponding gearbox maneuvers a screw 13, said screw 13 then actuating, by means of a nut 14, the supporting structure 7 of each mobile wall 3.

The shaft 12 is a shaft similar to those used in automobile window regulator mechanisms, for example. This shaft 12 is flexible and comprises a central core onto which a metal wire such as piano wire is tightly wound.

In the case of an adjusting device of the invention, the diameter of the flexible shaft is approximately 4 mm and the metal wire wound in a spiral has a diameter of approximately 2 mm, said metal wire being held in place on said core by being wound tightly with a pitch of approximately 4 mm.

The portions of the shaft 12 which run between two gearboxes 15 are inside a cover 17, partially represented in FIG. 3.

The gearboxes 15, which act as bevel gearboxes, are distributed at intervals of one gearbox per meter for example, along the length of the conveyor.

As an example, a shaft 12 of the type described above can cooperate with at most twenty-five gearboxes 15. For the embodiment illustrated in FIG. 3, there can also be a single motor 18, two shafts 12, and fifty gearboxes 15, depending on the length of the conveyor, with said conveyer being rectilinear or with one or more curved portions.

The motor 18 is, for example, a brushless electric motor with integrated reduction gear and connector. The adjusting device can also have control means (not represented) to record an adjustment setpoint and to actuate the motor 18 as a function of said adjustment setpoint.

The rotation of the flexible shaft 12, controlled by the motor 18, occurs in one direction or the other such that the wheel 11 can be driven in one direction or the other to bring the mobile wall 3 closer to or further apart from the fixed wall 2.

The free end of each of the shafts 12 is connected to a tensioning system 20. This tensioning system 20, represented in FIGS. 4 and 5, can form a type of module, said module being installed at the free end of the flexible shaft 12. This tensioning system comprises an elastic means in the form of a pre-tensioned spring 21 so as to provide a compression displacement and an elongation displacement when there are no forces exerted on the shaft 12.

The tensioning system 20 also comprises an attachment plate 22 which is integrally attached to the chassis 5 of the conveyor and which comprises two vertical positioning slits 23.

The tensioning system also comprises a stop 24 in the form of an angle bracket, mounted so that a first longitudinal part 24a slides on the positioning slits 23. A transverse part 24b of the stop 24, comprising a hole 24c, extends transversely to the longitudinal direction of the shaft 12.

The tensioning system 20 also comprises a guide tube 25 centered around the shaft 12 and positioned through the hole 24c; this tube 25 is able to slide longitudinally within said hole 24c. The free end of the shaft 12, onto which a ferrule 26 is attached, passes through the guide tube 25.

At its end which has the ferrule 26, the guide tube 25 has an inner shoulder 27 forming a support for a thrust bearing 28. The ferrule 26 comes against the thrust bearing 28.

The guide tube 25 also has an outer shoulder 29 at its end located on the side where the ferrule 26 is. One of the ends of the spring 21 presses against the shoulder 29 and the other end presses against the transverse part 24b.

The length of the shaft 12, and more specifically the position of the ferrule 26, is chosen to compress the spring 21, in the absence of forces originating from the motor 18. The pre-tensioning of the spring 21 allows the spring to provide a compression displacement and an elongation displacement in a manner that absorbs different forces exerted on the shaft 12.

The principle of the arrangement represented in FIG. 1 can also be found in other types of multi-row conveyors.

FIG. 6 shows another type of conveyor, where the fixed and mobile walls are suspended above the belt of the conveyor. The structure supporting the mobile walls 3 is housed and guided by means of a slide rail system which is integrated into a crosspiece 30 as a hanging frame, said hanging frame being integrally attached to the chassis 5 of the conveyor. In this version, the adjusting device assembly is located above the surface that conveys the bottles 1.

FIG. 7 is a transverse cross-sectional view showing details of another type of conveyor for objects such as packs 31, in which said conveyor is equipped with the adjusting device of the invention.

This pack 31 conveyor comprises:—guiding means in the form of walls 32 arranged above and in the vicinity of the conveyor belt 4 in order to guide said packs 31, and—adjusting means for adjusting the distance between said guide walls 32 which are all transversely mobile.

In this embodiment, there are in fact two sets of walls 32 which can be adjusted independently of each other by means of two adjusting devices; each set of walls 32 is, as above, maneuvered by a screw 33 with two inverse threadings and each thread cooperates with a nut 34, said nut 34 acting as a carrier for the corresponding wall and guided on a crosspiece 35 integrally attached to the chassis 5 of the conveyor.

These adjusting devices are superimposed and are operated in the same manner. The upper adjusting device is, for example, used to adjust the walls 32*e* situated at the edges, and the other adjusting device located underneath is used to adjust the walls 32*i* situated in the central part of the conveyor.

The gearbox 15 for each adjusting device acts as the first level of reduction with its toothed wheel rotated by the flexible shaft 12. This toothed wheel, housed in the gearbox 15, rotates the screw 33*e* which has, along its length, two threaded portions of inverse threads for moving the walls 32*e* closer together or further apart at the same time; the walls 32*i* are similarly maneuvered by the screw 33*i*, which is identical to said screw 33*e*.

In this example in FIG. 7, the position of four guide walls 32 in proximity to the conveyor belt 4 can be controlled, thus controlling the size of three conveyor corridors. The central corridor can, for example, have a first width and the corridors extending on each side of said central corridor can have a second width which may or may not be the same as the first width.

FIG. 8 is a partial cross-sectional view showing an advanced version of the adjusting device represented in FIG. 2. Here the device is mounted on a curved conveyor which also has fixed walls 2 and mobile walls 3. It is also suitable for other types of conveyors, particularly those presented in the present document.

FIG. 8, together with FIG. 9, shows the flexible shaft 12 of the adjusting device, extending along the curved exterior of the conveyor between the gearboxes 15. This adjusting device comprises, as above, a mechanism for maneuvering the structure 7 which consists of a floating nut 14, integrally attached to the U-section structure 7, and an endless screw 13. The endless screw 13 is connected to the wheel 11 by any appropriate means, said wheel 11 being associated with the flexible shaft 12 in the form of an endless screw. To limit losses due to friction as much as possible in the adjusting device, the unnecessary guides, particularly that of the maneuvering screw 13, are reduced to their simplest expression; said screw 13 is integrally attached to the wheel 11 and imposes its position on the nut 14 which is mounted in a floating assembly onto the structure 7; it is movable relative to said structure 7 within a plane perpendicular to the axis of said screw 13, guided within a sleeve 37 which is integrally attached to said structure 7.

The structure 7 supports the various mobile walls 3 while the crosspiece 9, on which said structure 7 is guided, supports the fixed walls, as detailed above for FIG. 1. Similarly, the structure 7 is guided relative to the crosspiece 9 by means of rollers 10.

Preferably, to avoid damage to the flexible shaft 12, the shaft can be encased in a cover 17 extending between two gearboxes 15. Similarly, to avoid damage to the toothed wheel 11, the wheel can be enclosed in a gearbox 15 made of appropriate thermoplastic material such as acetal, said material also being used for the covers 17.

The gearbox 15 is attached to the chassis 5 and it is designed to be opened and closed easily, to facilitate maintenance of the parts it encloses.

FIG. 10 is a transverse cross-sectional view of a pneumatic conveyor comprising an adjusting device of the invention. This conveyor comprises a blowing chamber 40 and a neck guide system 41 for bottles 1.

The gearboxes 15 cooperate with the flexible shaft 12 to transmit a displacement to the guide rails 24, or walls, in which the extent of the displacement is determined by the rotation, specifically by the number of rotations of the flexible shaft 12. Thus, for example, the guide rail 42 moves by 4 mm for about 40 turns of the flexible shaft 12. The movement of the rail 42 occurs by means of the endless screw 43 which cooperates with the toothed wheel 11, said screw 43 acting as a support for the rail 42 and is guided into the body of the gearbox, as detailed below for FIG. 11.

The gearboxes 15 are assembled facing each other on axle drops 44. These axle drops are connected to each other by a connecting rod 45 to guarantee stable positioning of the guide rails 42.

Pairs of gearboxes 15 are distributed, for example, one per meter along the entire length of the conveyor.

FIG. 11 shows a more detailed transverse cross-section of a gearbox 15 installed on one of the axle drops 44 of the pneumatic conveyor. The gearbox 15 contains the final drive consisting of the flexible shaft 12 and the toothed wheel 11, in which said toothed wheel 11 acts as a nut for maneuvering the endless screw 43 integrally attached to the rail 42 acting as the guide.

The gearbox 15 consists of two half-shells 151, 152 which are preferably identical. These half-shells enclose the toothed wheel 11 with its peripheral serrations, mounted with play in the housing 46. The diameters of the housing 46 and the wheel 11 are chosen to position a portion of the periphery of said wheel 11 within the calibrated passage 47 in a manner that meshes with the thread of the flexible shaft 12.

The serrations on the wheel 11 are indentations along the entire circumference with a semicircular cross-section, and the flexible shaft 12 is guided in the calibrated passage 47 of the half-shells 151, 152 for a length which is approximately half of said circumference of said wheel 11.

The wheel 11 acts as a nut for the screw 43, the threading extending along a portion of the length of the shank. The screw 43 also acts as an axle for the wheel 11; its rotational motion is prevented by the guide rail 42 but it can move translationally under the effect of the rotation of the wheel 11, which itself is rotated by the flexible shaft 12. The subassembly comprising the wheel 11 and the screw 43 is therefore mounted with play in the housing 46. The cooperation of this sub-assembly with the flexible shaft 12 allows optimizing its positioning in the housing 46.

The gearbox 15 advantageously comprises cylindrical projections to cover the threading of the screw 43 along the entire translational travel of said screw 43. This prevents the threading from becoming fouled.

The gearboxes 15 are intended to be attached to the axle drops 44. These gearboxes 15 are attached to the axle drops 44 with three screws 49 for example, as shown in FIG. 12.

FIG. 13 shows the inner surface of a half-shell, with partial representations of the flexible shaft 12 and the covers 17 which enclose, on each side of the housing 15, the sections of the flexible shaft 12. As represented in FIG. 12, the gearboxes 15 delimit openings 50 into which the covers 17 are inserted.

The half-shell 151 has a portion of the housing 46 as well as a portion of the calibrated passage 47. The half-shell 151 also comprises attachment holes which the screws 49 pass through during its final assembly with the other half-shell 152 onto an axle drop 44. The half-shell 151 also comprises a hole 49' to accommodate the passage of a countersunk head screw which allows its prior assembly onto the axle drop 44 in order to install the toothed wheel 11 and the flexible shaft 12, as explained below with the description of the method for assembling the adjusting device.

The gearbox 15 encloses the wheel 11 with its peripheral serrations, mounted with play in the housing 46. The diameters of the housing 46 and the wheel 11 are chosen to position a portion of the periphery of said wheel 11 within the calibrated passage 47 in a manner that meshes with the thread of the flexible shaft 12.

FIG. 12 is a side view of FIG. 10, showing the installation of a gearbox 15 of the adjusting device of the invention, on an axle drop 44 of the pneumatic conveyor.

In an application such as the one described in relation to FIG. 12 above, the method for assembling an adjusting device comprising several gearboxes 15 onto a pneumatic conveyor therefore consists of:
attaching a half-shell 151 of each gearbox 15 onto the conveyor, more specifically onto an axle drop 44,
placing a wheel 11 in each half-shell 151 and engaging said wheel 11 with an end of the corresponding endless screw 43, the other end of said screw 43 being attached and held in place on a rail 42 acting as a guide,
sizing the covers 17 and threading them onto the flexible shaft 12 section,
positioning the covers 17 on the corresponding first half-shells 151 and immobilizing them in place, and
installing the flexible shaft 12 in the portions of the calibrated passages 47 of the first half-shells 151 and connecting the flexible shaft 12 to the motor 18 and to the tensioning system 20,
positioning the covers 17 on the corresponding first half-shells 151 and immobilizing them in place,
closing each gearbox 15 by attaching the second half-shell 152 to the first half-shell 151 already in place,
positioning the maneuvering screw 43 in a pre-established position by means of a stop or, for example, a reference face 52 such as the face corresponding to the end of the projection 48 from the half-shell 152 situated on the exterior of the conveyor.

In an application such as the one described in relation to FIG. 3 or FIG. 9, as well as in the applications corresponding to FIGS. 6 and 7, the method of assembling an adjusting device comprising several gearboxes 15 onto a conveyor therefore consists of:
attaching a half-shell 151 of each gearbox 15 onto the chassis of the conveyor,
placing a wheel 11 in each half-shell 151 and integrally attaching said wheel 11 to an end of the corresponding flexible shaft 12,
sizing the covers 17 and threading them onto each flexible shaft 12 section,
installing the flexible shaft 12 in the portions of the calibrated passages 47 of the first half-shells 151 and connecting said flexible shaft 12 to the motor 18 and to the tensioning system 20,
closing each gearbox 15 by attaching the second half-shell 152 to the first half-shell 151 already in place.

The invention also relates to a system for assembling an endless screw in the form of a flexible shaft 12 that is very long in length, at least 10 meters or so, driven at one of its ends by a motor means 18 in order to maneuver toothed wheels 11 which actuate walls or rails of conveyor corridors, for example.

The assembly system comprises, at the free end of the shaft 12, a tensioning module or tension retaining module able to absorb the reaction forces in said shaft 12 in order to eliminate, or at least reduce, angular deviations in the driving of said actuating wheels 11. Said module comprises a tensioning system which consists of a thrust bearing 28 placed between a ferrule 26 integrally attached to said free end of the shaft 12 and a shoulder 27. This shoulder 27 is on a tube centered around the shaft 12, with said tube 25 being movable relative to the chassis 5 of the conveyor and held in position by an elastic means such as a spring 21, said spring being pre-tensioned so as to provide a compression displacement and an elongation displacement when no forces are being exerted on the flexible shaft 12.

Such an assembly system attenuates the vibrations of the flexible shaft 12 when it is rotated.

The invention claimed is:

1. A width-adjusting device for conveyor corridor(s), comprising a mechanism with high gear reduction integrally attached to a chassis of said conveyor, said mechanism being arranged between a control shaft and a wall or walls of said corridor and comprising:
a final drive offering irreversible operation, comprising:— said control shaft in the form of a first endless screw, and—a toothed wheel,
a maneuvering system for maneuvering at least one of the walls of said corridor, comprising a second endless screw and a nut, said second endless screw being mobile or fixed relative to said toothed wheel.

2. The width-adjusting device for conveyor corridor(s), according to claim 1, wherein said final drive operates with a ratio on the order of 1/40.

3. The width-adjusting device for conveyor corridor(s), according to claim 1, wherein said control shaft is a flexible shaft, said control shaft comprising a central core having a diameter of approximately 4 mm onto which a metal wire having a diameter of approximately 2 mm is wound, said wire being held in place on said core by being tightly wound at a pitch of approximately 4 mm.

4. The width-adjusting device for conveyor corridor(s), according to claim 1, wherein said control shaft is a long flexible shaft connected to at least one tensioning system for maintaining the tension of said flexible shaft, said tensioning system being arranged between an end of said flexible shaft and said chassis of the conveyor, to absorb pulling and pushing forces exerted on said flexible shaft according to the direction of rotation of said flexible shaft.

5. The width-adjusting device for conveyor corridor(s), according to claim 4, wherein said at least one tensioning system comprises a thrust bearing placed between a ferrule integrally attached to an end of said flexible shaft and a shoulder, said shoulder being on a tube which is mobile relative to said chassis of the conveyor and which is held in position by a pre-tensioned spring, so as to provide a compression displacement and an elongation displacement when there are no forces exerted on said flexible shaft.

6. The width-adjusting device for conveyor corridor(s), according to claim 1, wherein said control shaft is maneuvered by a motor means and wherein the width-adjusting device comprises a control means for saving an adjustment set-point for the width of the corridor or corridors, and for actuating said motor means as a function of said adjustment set-point.

7. The width-adjusting device for conveyor corridor(s), according to claim 1, wherein a motor for actuating said maneuvering system is positioned at the midpoint of a flexible control shaft or between two flexible control shafts which are very long, a free end of each of said flexible control shaft(s) being attached to a tensioning system.

8. The width-adjusting device for conveyor corridor(s), according to claim 1, wherein said final drive comprising a flexible control shaft and said toothed wheel engages in a gearbox and, between two consecutive gearboxes, said flexible control shaft is housed in a guiding protective cover, said cover having ends fitted into and/or attached to said corresponding gearboxes.

9. The width-adjusting device for conveyor corridor(s) according to claim 8, wherein said gearbox comprising:
two half-shells made of acetal material, machined and intended to be attached to said chassis of the conveyor,
a substantially cylindrical housing delimited by said half-shells when they are assembled, said housing being occupied by said toothed wheel,
a passage calibrated for said flexible control shaft and arranged in each of said half-shells, said calibrated passage being positioned orthogonally to an axis of said housing and tangential to said housing to allow the operation of said final drive comprising the flexible shaft and
said half-shells comprise cylindrical projections to guide and cover the threading of said second endless screw for maneuvering said rail(s), or wall(s), of the corridor(s).

10. A method for assembling a width-adjusting device for corridor(s), comprising
a mechanism with high gear reduction integrally attached to a chassis of said conveyor, said mechanism being arranged between a control shaft and a wall or walls of said corridor and comprising:
a final drive offering irreversible operation, comprising:—
said control shaft in the form of a first endless screw, and—a toothed wheel,
a maneuvering system for maneuvering at least one of the walls of said corridor, comprising a second endless screw and a nut, said second endless screw being mobile or fixed relative to said toothed wheel,
said final drive comprising a flexible control shaft and said toothed wheel engages in a gearbox and, between two consecutive gearboxes, said flexible control shaft is housed in a guiding protective cover, said cover having ends fitted into and/or attached to said corresponding gearboxes,
said gearbox comprising:
two half-shells machined and intended to be attached to said chassis of the conveyor,
a substantially cylindrical housing delimited by said half-shells when they are assembled, said housing being occupied by said toothed wheel,
a passage calibrated for said flexible control shaft and arranged in each of said half-shells, said calibrated passage being positioned orthogonally to an axis of said housing and tangential to said housing to allow the operation of said final drive and,—said half-shells comprise cylindrical projections to guide and cover the threading of said second endless screw for maneuvering said wall(s), of the corridor(s) onto a single row or multi-row conveyor, said method comprising:
attaching one of said half-shells of each gearbox onto said chassis of said conveyor,
sizing said covers which extend between two gearboxes and slipping them onto the corresponding portion of said flexible control shaft,
placing in one of said half-shells said final drive comprising said flexible control shaft and said toothed wheel with said corresponding covers,
closing each gearbox by attaching the other half-shell to said half-shell already in place, and
connecting said flexible control shaft to a motor.

11. The method according to claim 10, wherein, in the case of an adjusting device in which said toothed wheel acts as a nut for said second endless screw that maneuvers the corresponding wall, said method also comprising, after having placed said final drive in a half-shell, positioning and installing said second endless screw in a pre-established position, by means of a stop or, a face at an end of a projection from said other half-shell and which can act as a reference surface.

12. A tension module associated with a flexible shaft which is long and is in the form of an endless screw, said flexible shaft being driven at one of its ends by a motor means in order to maneuver toothed wheels which actuate means for adjusting one or more of walls of conveyor corridor(s), said tension module being arranged at said free end of said flexible shaft and comprising a tensioning system comprising a thrust bearing placed between a ferrule integrally attached to said free end of said flexible shaft and a shoulder, said shoulder being on a tube centered around said flexible shaft and being mobile relative to a chassis of said conveyor while being held in position by a pre-tensioned spring, in a manner that provides a compression displacement and an elongation displacement when there are no forces exerted on said flexible shaft.

* * * * *